Feb. 12, 1935.  C. M. WAITS  1,991,303
ADJUSTABLE COMBINED EXTENSION AND SUSPENSION STRUCTURE
Filed Jan. 20, 1934
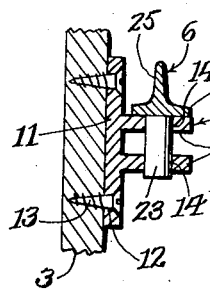
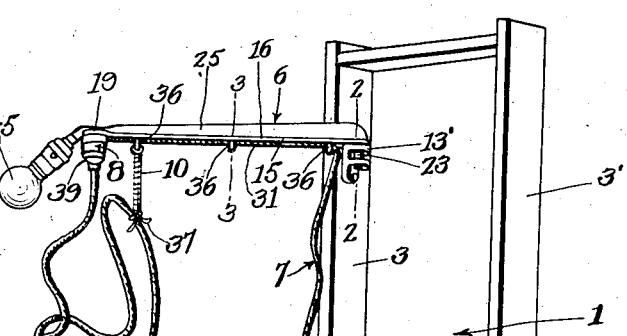
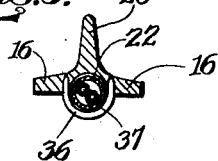
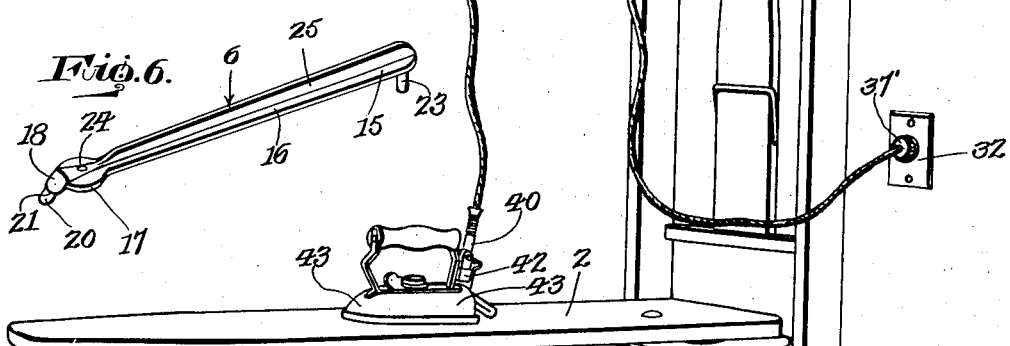
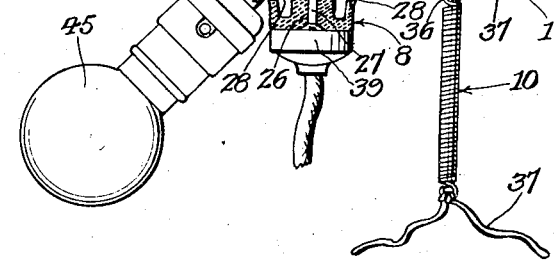
Inventor
Charles M. Waits
Geo. P. Kimmel
Attorney Patented Feb. 12, 1935

1,991,303

UNITED STATES PATENT OFFICE 1,991,303

ADJUSTABLE COMBINED EXTENSION AND SUSPENSION STRUCTURE

Charles M. Waits, Fullerton, Calif.

Application January 20, 1934, Serial No. 707,620

5 Claims. (Cl. 248—30.5)

This invention relates to an adjustable combined extension and suspension structure for a pair of electrical outputs and a common conducting means for said outputs, and is designed primarily for use in connection with ironing boards, but it is to be understood that an extension and suspension structure, in accordance with this invention, may be employed in any connection for which it is found applicable, and the invention has for its object to provide, in a manner as hereinafter set forth, a structure of the class referred to, for adjustably suspending an electric lamp connected to one of the outputs in an elevated position and for vertically suspending a flexible circuit connection leading from the other output to a point of consumption.

In the adaptation of the invention with respect to an ironing board, the invention aims to maintain the flexible circuit connection for an electrically heated sad-iron above the board in a manner to prevent it interfering with one employing the iron or being disposed in the path of the iron, and further to illuminate the board during the use of the iron.

The invention further aims to provide, in a manner as hereinafter set forth, a horizontally disposed loosely pivoted adjustable combined extension and suspension structure for removable connection to a stationary bracket anchored to a support, and having as parts thereof a hanger element and a pair of electrical outputs for coupling thereto, so as to bodily move therewith, an electric lamp and a flexible circuit connection and with the latter resiliently suspended intermediate its ends.

A further object of the invention is to provide, in a manner as hereinafter set forth, a horizontally disposed loosely pivoted adjustable combined extension and suspension structure, including as parts thereof a pair of electrical outputs disposed at an angle with respect to each other, and a current conducting means common to said outputs. The said outputs being in the form of couplers for detachably connecting to said structure an electric lamp and a flexible circuit connection.

Further objects of the invention are to provide, in a manner as hereinafter set forth, a combined extension and suspension structure for the purpose referred to which is comparatively simple in its construction and arrangement, strong, durable, compact, readily assembled, thoroughly efficient in its use, conveniently positioned to attain the aims sought thereby, and comparatively inexpensive to manufacture.

To the above ends essentially and to others which may hereinafter appear, the invention consists of such parts, and such combination of parts which fall within the scope of the invention as claimed.

In the drawing:

Figure 1 is a perspective view of an ironing board extended outwardly in fixed relation with respect to its housing, and showing the adaptation therewith of the adjustable combined extension and suspension structure disposed in its suspending position for an electric lamp and a flexible circuit connection leading to an electrically heated sad-iron upon the board.

Figure 2 is a section on line 2—2 Figure 1.

Figure 3 is a section on line 3—3 Figure 1.

Figure 4 is a fragmentary view in side elevation and partly in longitudinal section of the structure.

Figure 5 is a fragmentary view in top plan of the structure.

Figure 6 is a perspective view of the arm of the structure.

Referring to the drawing, 1 indicates an open front holder for supporting and housing an ironing board 2 which is adapted to be extended from holder 1 to a position at right angles to the latter and be supported in such position. The sides of holder 1 are designated 3, 3'. Within holder 1 and above board 2 is an ironing in holder 1 and above board 2 is an ironing board 4 of less dimension than the latter and which is capable of being extended from housing 1 to a position at right angles to the latter. The foregoing structure is illustrated by way of example to enable one to understand the manner in which the combined extension and suspension structure would be arranged with respect to an ironing board.

The structure includes an anchoring element 5 for coupling it to a support, a horizontally disposed arm 6 pivotally supported by and for extension from the bracket, an electrical conducting means 7 for connection to a source of electrical energy, a pair of electrical outputs 8, 9 constituting couplers and to which the conducting means is common, and a resilient hanger 10.

The support to which the element 5 is anchored is illustrated by way of example to the side 3 of the open front holder 1. The element 5 comprises a base plate 11, formed with spaced openings 12 for the passage of holdfast means 13 for fixedly securing it stationary. Formed integral with one face of plate 11 is a pair of spaced superposed parallel ears 13' having aligning openings 14. The plate 11 is shown by way of example as being secured to near the upper end of the inner face of side 3 of holder 1.

The arm 6 includes a horizontally disposed body part 15 formed of stretches 16, 17 and 18. The stretch 16 is flat, of materially greater length than any of the other stretches, and decreases in width from its inner to its outer end. The stretch 17 is of circular contour, has a flat lower face and is formed diametrically of its upper face with an enlargement 19. The stretch 16 at its outer end merges into the inner side of and is disposed concentrically with respect to stretch 17. The latter is of greater diameter than the width of stretch 16. The stretch 18 is of tubular form, extends from and is disposed at a downward inclination with respect to the front of stretch 17. The stretch 18 has the upper portion of its rear edge integral with the front of stretch 17 and the outer end of enlargement 19. The stretch 18 is set up with a reduced outer portion 20 which provides a peripheral shoulder 21. The stretch 16 has its lower face formed with a groove 22 disposed lengthwise thereof and which extends from a point adjacent the rear end of such stretch to the point of joinder of the latter with stretch 17. Depending from the lower face of stretch 16 adjacent the rear end of groove 22 is a pivot pin 23 which is mounted in the aligning openings 14 of the ears 13' of element 5 whereby arm 6 is pivotally supported from element 5. The stretch 17 axially thereof is formed with a vertical opening 24 having a threaded wall. The stretch 17 has its lower face grooved, as at 24' forwardly of its axis at its diametrical center.

The arm 6 also includes an upstanding reinforcing web 25 disposed on one of its lengthwise edges and integral with the upper face of stretch 16 at the longitudinal median of the latter. The web 25 extends from the rear end of stretch 16 to and merges into the rear end of enlargement 19. The web 25 decreases in height from its rear to its front end.

The electrical output 8 is positioned against the lower face of stretch 17 and is in the form of a socket to receive a plug to be hereinafter referred to. Extending upwardly through an opening 26 in the output 8 and threadedly engaging with the wall of opening 24 is a clamping screw 27 for connecting stretch 17 and output 8 together. The upper portion of output 8 is hollow and it is formed with a pair of diametrically opposed cutouts 28 to provide clearances. The output 8 also includes a pair of terminals 29, 29' which lead to contacts not shown.

The electrical output 9 is in the form of a socket to receive a plug to be presently referred to. The rear end of output 9 is formed with a reduced sleeve 30 which is mounted on and suitably fixed to the reduced outer portion 20 of the stretch 18. The sleeve 30 abuts shoulder 21.

Mounted in the groove 22 is a stretch 31 of the flexible current conducting means 7 which leads from wall socket 32 connected with a source of electrical supply. The means 7 includes a pair of circuit conductors 33, 34 which are in electrical contact intermediate their ends with the posts 29, 29' respectively. The means 7 includes a stretch 35 which extends through groove 24', stretch 18 and is electrically connected to the output 9. The stretch 31 is maintained in the groove 22 by a series of spaced coupling yokes 36 depending from and anchored to stretch 16. The means 7 includes a stretch 37 which extends from stretch 31 and carries a plug 37' for detachable connection to socket 32. The terminals 29, 29' are connected to the means 7 between stretches 31 and 35.

Attached to the outer coupling yoke 36 and depending therefrom is the resilient hanger 10 provided at its lower end with a tie-member 37.

There is illustrated a flexible circuit connection or cord 38 provided with plugs 39, 40 for detachable engagement with the output 8 and a socket 42 respectively. The socket 42 is provided on an electrically heated sad-iron 43. The connection between the output 8 and socket 42 closes the heating circuit for iron 43. The hanger 10 is adapted to be tied to the cord 38 intermediate the ends of the latter by the member 37 whereby the major portion of the length of cord 38 will be held resiliently in a vertical position. The output 8 and hanger 10 provide for coupling cord 38 with the arm 6 whereby when the latter is shifted upon bracket 5 the cord 38 will be carried therewith, as well as further acting to prevent the cord 38 interfering with a person when using the iron 43 or a portion of the cord 38 falling upon board 2 in the path of the iron.

There is illustrated an electric lamp 45 provided with a plug to detachably engage the output 9 whereby a lighting circuit is closed and the board 2 illuminated during the operation of the iron. The output 9 couples the lamp 45 with arm 6 whereby when the latter is shifted the lamp 45 will be carried therewith. The stretch 18 disposes lamp 45 at a downward inclination.

Interposed between the output 8 and stretch 17 is a non-conducting washer or packing 46 through which extends the screw 27.

The clearances provided by the cutouts 28 are for the forward end of stretch 31 and rear end of the stretch 35.

What I claim is:—

1. In a combined extension and suspension structure a horizontally disposed suspension device for a pair of electrical outputs and circuit connections leading to said outputs, said device being provided at its inner end with a depending vertically disposed pivot adapted to loosely extend into a support for said end, said device in proximity to its outer end being formed with a disc-like portion provided with an opening adapted to have extended therethrough means for anchoring one of said outputs with the lower face of said outer end, and said device being formed at its outer end with an outwardly extending downwardly inclined tubular portion open at each end and adapted to have the other output connected thereto and for the passage of said connections to the said other output.

2. In a combined extension and suspension structure a horizontally disposed suspension device for a pair of electrical outputs and circuit connections leading to said outputs, said device being provided at its inner end with a depending vertically disposed pivot adapted to loosely extend into a support for said end, said device in proximity to its outer end being formed with a disc-like portion provided with an opening adapted to have extended therethrough means for anchoring one of said outputs with the lower face of said outer end, said device being formed at its outer end with an outwardly extending downwardly inclined tubular portion open at each end and adapted to have the other output connected thereto and for the passage of said connections to the said other output, and said device having means depending from its lower face for connecting an intermediate stretch of the said circuit connections therewith.

3. In a combined extension and suspension structure a horizontally disposed arm adjustable in a horizontal path, a pivot depending from the inner end of the lower face of the arm and adapted to loosely extend into a support for the said inner end, said arm formed of an intermediate, an inner end and an outer end stretch, said inner end stretch being of greater length than said other stretches and formed with a flat lower face provided with a groove extending lengthwise thereof, said intermediate stretch being of disc like contour and formed with an axial opening, and said outer end stretch being of a width less than that of said intermediate stretch, said outer end stretch being of tubular form and open at each end and extending downwardly at an inclination with respect to said intermediate stretch, the inner end of the top portion of the body of said outer end stretch being integral with the front edge of said intermediate stretch.

4. In a structure for the purpose set forth, a combined suspending and retain device for a pair of electrical outputs and circuit connections leading to said outputs, said device including an arm formed of an inner end stretch adapted to have anchored against the lower face thereof a part of the length of said circuit connections, an intermediate stretch adapted to have anchored with the lower face thereof one of said outputs and another part of the length of said circuit connections and an outer end stretch adapted to have connected therewith the said other output and for the passage of another part of the length of said circuit connections, said stretches merging into each other, a pivot depending from the inner end of the inner end stretch and adapted to loosely extend into a support for said arm, said intermediate stretch being in the form of an axially apertured disc, said outer end stretch being in the form of a downwardly inclined tube open at each end, the top of the body of said outer end stretch being integral centrally with the forward edge part of said intermediate stretch, the latter being of greater width than said outer end stretch and the forward end of said inner end stretch.

5. In a structure for the purpose set forth, a combined suspending and retaining device for a pair of electrical outputs and circuit connections leading to said outputs, said device including an arm formed of an inner end stretch adapted to have anchored against the lower face thereof a part of the length of said circuit connections, an intermediate stretch adapted to have anchored with the lower face thereof one of said outputs and another part of the length of said circuit and another part of the length of said circuit connections and an outer end stretch adapted to have connected therewith the said other output and for the passage of another part of the length of said circuit connections, said stretches merging into each other, a pivot depending from the inner end of the inner end stretch and adapted to loosely extend into a support for said arm, said intermediate stretch being in the form of an axially apertured disc, said outer end stretch being in the form of a downwardly inclined tube open at each end, the top of the body of said outer end stretch being integral centrally with the forward edge part of said intermediate stretch, the latter being of greater width than said outer end stretch and the forward end of said inner end stretch, said inner end stretch being formed lengthwise of its lower face with a groove to receive that part of the length of said connections anchored therewith, spaced retaining elements depending from the lower face of said inner end stretch for anchoring said connections in said groove, and means engaging the wall of the aperture in said intermediate stretch for anchoring an output and said connections with the latter.

CHARLES M. WAITS.